(12) United States Patent
Henry et al.

(10) Patent No.: US 7,380,109 B2
(45) Date of Patent: *May 27, 2008

(54) APPARATUS AND METHOD FOR PROVIDING EXTENDED ADDRESS MODES IN AN EXISTING INSTRUCTION SET FOR A MICROPROCESSOR

(75) Inventors: G. Glenn Henry, Austin, TX (US); Rodney E. Hooker, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 10/227,571

(22) Filed: Aug. 22, 2002

(65) Prior Publication Data

US 2003/0196077 A1    Oct. 16, 2003

Related U.S. Application Data

(60) Provisional application No. 60/373,229, filed on Apr. 15, 2002.

(51) Int. Cl.
*G06F 9/44* (2006.01)

(52) U.S. Cl. ...................................... 712/227
(58) Field of Classification Search ................ 712/209, 712/227

See application file for complete search history.

(56) References Cited

U.S. PATENT DOCUMENTS 3,657,705 A * 4/1972 Mekota et al. .............. 712/208
4,064,554 A 12/1977 Tubbs
4,217,638 A 8/1980 Namimoto et al.

(Continued)

FOREIGN PATENT DOCUMENTS

CN    1431584    7/2003

(Continued)

OTHER PUBLICATIONS

Intel Architecture Software Developer's Manual, vol. 2: Instruction Set Reference, 1999, pp. 2-1 to 2-4, 3-332, 3-353 and B-25.*

(Continued)

*Primary Examiner*—Eddie Chan
*Assistant Examiner*—Robert E Fennema
(74) *Attorney, Agent, or Firm*—Richard K. Huffman; James W. Huffman

(57) ABSTRACT

An apparatus and method are provided for extending a microprocessor instruction set to allow for extended size addresses. The apparatus includes translation logic and extended execution logic. The translation logic translates an extended instruction into an associated micro instruction sequence for execution by the microprocessor, where the extended instruction has an extended prefix and an extended prefix tag. Extended prefix specifies an extended address mode for an address calculation corresponding to an operation, where the extended address mode not otherwise provided for by instructions in an existing instruction set. The extended prefix tag indicates the extended prefix, where the extended prefix tag is an otherwise architecturally specified opcode within the existing instruction set. The extended execution logic is coupled to the translation logic. The extended execution logic receives the associated micro instruction sequence, and performs the address calculation to generate an extended address according to the extended address mode.

34 Claims, 6 Drawing Sheets

Extended Instruction Format

U.S. PATENT DOCUMENTS

| | | |
|---|---|---|
| 4,547,849 A | 10/1985 | Louie et al. |
| 5,029,069 A | 7/1991 | Sakamura |
| 5,142,679 A | 8/1992 | Owaki et al. |
| 5,218,712 A | 6/1993 | Cutler et al. |
| 5,448,744 A | 9/1995 | Eifert et al. |
| 5,471,595 A | 11/1995 | Yagi et al. |
| 5,481,684 A | 1/1996 | Richter et al. |
| 5,687,338 A | 11/1997 | Boggs et al. |
| 5,751,996 A | 5/1998 | Glew et al. |
| 5,768,574 A | 6/1998 | Dutton et al. |
| 5,778,220 A | 7/1998 | Abramson et al. |
| 5,796,973 A * | 8/1998 | Witt et al. ............. 712/208 |
| 5,822,778 A | 10/1998 | Dutton et al. |
| 5,826,089 A | 10/1998 | Ireton |
| 5,857,103 A | 1/1999 | Grove |
| 5,875,342 A | 2/1999 | Temple |
| 5,913,049 A | 6/1999 | Shiell et al. |
| 5,937,199 A | 8/1999 | Temple |
| 5,991,872 A | 11/1999 | Shiraishi et al. |
| 6,014,735 A * | 1/2000 | Chennupaty et al. ....... 712/210 |
| 6,029,222 A | 2/2000 | Kamiya |
| 6,058,472 A | 5/2000 | Panwar et al. |
| 6,085,312 A | 7/2000 | Abdallah et al. |
| 6,157,996 A | 12/2000 | Christie et al. |
| 6,199,155 B1 | 3/2001 | Kishida et al. |
| 6,230,259 B1 | 5/2001 | Christie et al. |
| 6,317,822 B1 | 11/2001 | Padwekar |
| 6,351,806 B1 * | 2/2002 | Wyland ..................... 712/225 |
| 6,405,305 B1 | 6/2002 | Meier et al. |
| 6,434,693 B1 | 8/2002 | Senter et al. |
| 6,456,891 B1 | 9/2002 | Kranich et al. |
| 6,549,999 B2 | 4/2003 | Kishida et al. |
| 6,560,694 B1 * | 5/2003 | McGrath et al. ............ 712/210 |
| 6,581,154 B1 | 6/2003 | Zaidi |
| 6,647,488 B1 | 11/2003 | Takeno et al. |
| 6,779,103 B1 | 8/2004 | Alexander, III et al. |
| 6,823,414 B2 | 11/2004 | Radhakrishna |
| 6,883,053 B2 | 4/2005 | Shinagawa et al. |
| 2001/0013870 A1 | 8/2001 | Pentkovski et al. |
| 2002/0194457 A1 | 12/2002 | Akkary |
| 2003/0159020 A1 | 8/2003 | Henry et al. |
| 2003/0172252 A1 | 9/2003 | Henry et al. |
| 2003/0188130 A1 | 10/2003 | Henry et al. |
| 2005/0102492 A1 | 5/2005 | Henry et al. |
| 2005/0188179 A1 | 8/2005 | Henry et al. |

FOREIGN PATENT DOCUMENTS

| | | |
|---|---|---|
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

Paap et al, "Power PC™: A Performance Architecture," COMPCON Spring '93, Digest of Papers, San Francisco, CA, IEEE Computer Society, Feb. 22, 1993, pp. 104-108.

Silberman et al. *An Architectural Framework for Supporting Heterogeneous Instruction-Set Architectures.* Computer, IEEE Computer Society, Long Beach, CA. US vol. 26, No. 6, Jun. 1, 1993. pp. 39-56. ISSN: 0018-0162.

Patterson & Hennessy. "Computer Organization and Design: The Hardware/Software Interface." 1998. Morgan Kaufmann Publishers, Inc. Second Edition. pp. 177-178, 297.

Dobb. "Microprocessor Resources." 2000. http://web.archive.org/web/20000118231610 http://x86.org/secrets/opcodes/Icebp.htm.

* cited by examiner

*Fig. 1 (Related Art)*

*Microprocessor Instruction Format*

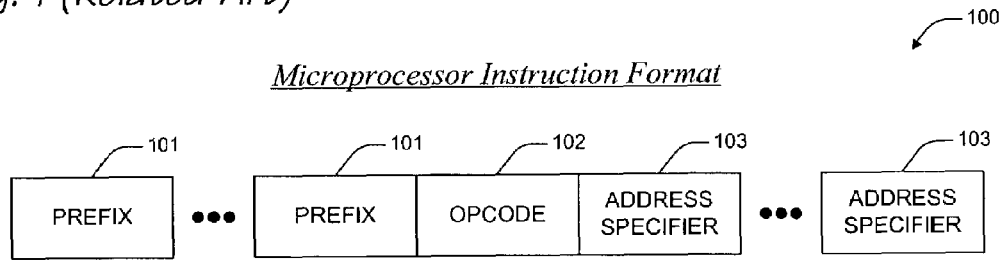

*Fig. 2 (Related Art)*

*8-Bit Opcode Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | I00 | I01 | I02 | I03 | I04 | I05 | I06 | I07 | I08 | I09 | I0A | I0B | I0C | I0D | I0E | I0F |
| 1 | I10 | I11 | I12 | I13 | I14 | I15 | I16 | I17 | I18 | I19 | I1A | I1B | I1C | I1D | I1E | I1F |
| 2 | I20 | I21 | I22 | I23 | I24 | I25 | I26 | I27 | I28 | I29 | I2A | I2B | I2C | I2D | I2E | I2F |
| 3 | I30 | I31 | I32 | I33 | I34 | I35 | I36 | I37 | I38 | I39 | I3A | I3B | I3C | I3D | I3E | I3F |
| 4 | I40 | I41 | I42 | I43 | I44 | I45 | I46 | I47 | I48 | I49 | I4A | I4B | I4C | I4D | I4E | I4F |
| 5 | I50 | I51 | I52 | I53 | I54 | I55 | I56 | I57 | I58 | I59 | I5A | I5B | I5C | I5D | I5E | I5F |
| 6 | I60 | I61 | I62 | I63 | I64 | I65 | I66 | I67 | I68 | I69 | I6A | I6B | I6C | I6D | I6E | I6F |
| 7 | I70 | I71 | I72 | I73 | I74 | I75 | I76 | I77 | I78 | I79 | I7A | I7B | I7C | I7D | I7E | I7F |
| 8 | I80 | I81 | I82 | I83 | I84 | I85 | I86 | I87 | I88 | I89 | I8A | I8B | I8C | I8D | I8E | I8F |
| 9 | I90 | I91 | I92 | I93 | I94 | I95 | I96 | I97 | I98 | I99 | I9A | I9B | I9C | I9D | I9E | I9F |
| A | IA0 | IA1 | IA2 | IA3 | IA4 | IA5 | IA6 | IA7 | IA8 | IA9 | IAA | IAB | IAC | IAD | IAE | IAF |
| B | IB0 | IB1 | IB2 | IB3 | IB4 | IB5 | IB6 | IB7 | IB8 | IB9 | IBA | IBB | IBC | IBD | IBE | IBF |
| C | IC0 | IC1 | IC2 | IC3 | IC4 | IC5 | IC6 | IC7 | IC8 | IC9 | ICA | ICB | ICC | ICD | ICE | ICF |
| D | ID0 | ID1 | ID2 | ID3 | ID4 | ID5 | ID6 | ID7 | ID8 | ID9 | IDA | IDB | IDC | IDD | IDE | IDF |
| E | IE0 | IE1 | IE2 | IE3 | IE4 | IE5 | IE6 | IE7 | IE8 | IE9 | IEA | IEB | IEC | IED | IEE | IEF |
| F | IF0 | IF1 | IF2 | IF3 | IF4 | IF5 | IF6 | IF7 | IF8 | IF9 | IFA | IFB | IFC | IFD | IFE | IFF |

Fig. 3

*Extended Instruction Format*

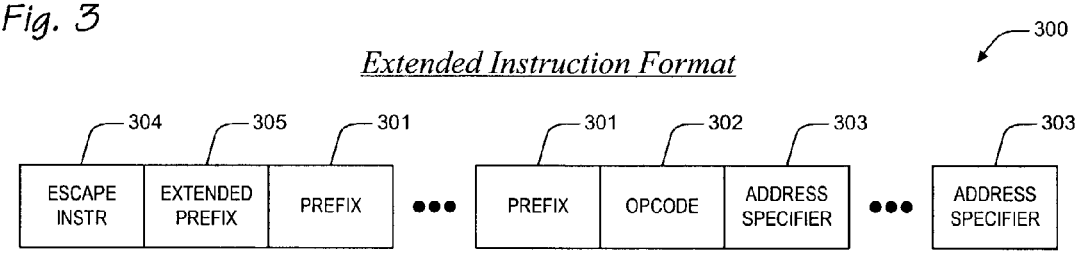

Fig. 4

*8-Bit Extended Prefix Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

*Microprocessor For Employing Extended Address Modes*

*Extended Prefix for Prescribing Extended Address Modes*

*Translate Stage Details*

*Execute Stage Details*

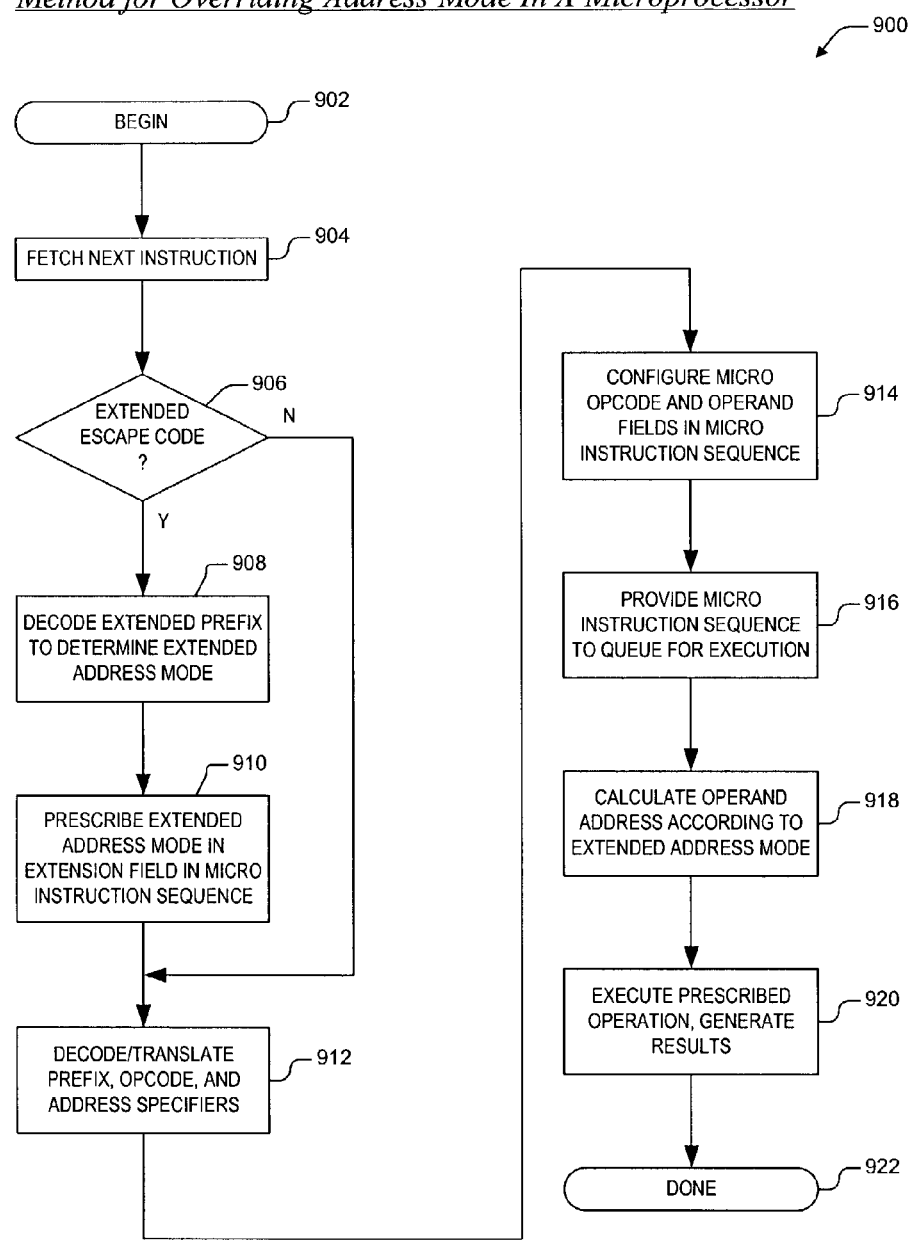

APPARATUS AND METHOD FOR PROVIDING EXTENDED ADDRESS MODES IN AN EXISTING INSTRUCTION SET FOR A MICROPROCESSOR

CROSS-REFERENCE TO RELATED APPLICATIONS

This application claims the benefit of U.S. Provisional Application No. 60/373,229 filed on Apr. 15, 2002.

This application is related to the following co-pending U.S. Patent Applications, all of which have a common assignee and common inventors.

| SERIAL NUMBER | FILING DATE | TITLE |
| --- | --- | --- |
| 10144595 | May 9, 2002 | APPARATUS AND METHOD FOR EXTENDING A MICROPROCESSOR INSTRUCTION SET |
| 10144592 | May 9, 2002 | APPARATUS AND METHOD FOR CONDITIONAL INSTRUCTION EXECUTION |
| 10227572 | Aug. 22, 2002 | APPARATUS AND METHOD FOR SELECTIVE MEMORY ATTRIBUTE CONTROL |
| 10144593 | May 9, 2002 | APPARATUS AND METHOD FOR SELECTIVE CONTROL OF CONDITION CODE WRITE BACK |
| 10144590 | May 9, 2002 | MECHANISM FOR EXTENDING THE NUMBER OF REGISTERS IN A MICROPROCESSOR |
| 10227008 | Aug. 22, 2002 | APPARATUS AND METHOD FOR EXTENDING DATA MODES IN A MICROPROCESSOR |
| 10283397 | Oct. 29, 2002 | SUPPRESSION OF STORE CHECKING |
| 10384390 | Mar. 10, 2003 | SELECTIVE INTERRUPT SUPPRESSION |
| 10227583 | Aug. 22, 2002 | NON-TEMPORAL MEMORY REFERENCE CONTROL MECHANISM |
| 10144589 | May 9, 2002 | APPARATUS AND METHOD FOR SELECTIVE CONTROL OF RESULTS WRITE BACK |

BACKGROUND OF THE INVENTION

1. Field of the Invention

This invention relates in general to the field of microelectronics, and more particularly to a technique for incorporating extended address modes into an existing microprocessor instruction set architecture.

2. Description of the Related Art

Since microprocessors were fielded in the early 1970's, their use has grown exponentially. Originally applied in the scientific and technical fields, microprocessor use has moved over time from those specialty fields into commercial consumer fields that include products such as desktop and laptop computers, video game controllers, and many other common household and business devices.

Along with this explosive growth in use, the art has experienced a corresponding technology pull that is characterized by an escalating demand for increased speed, expanded addressing capabilities, faster memory accesses, larger operand size, more types of general purpose operations (e.g., floating point, single-instruction multiple data (SIMD), conditional moves, etc.), and added special purpose operations (e.g., digital signal processing functions and other multi-media operations). This technology pull has resulted in an incredible number of advances in the art which have been incorporated in microprocessor designs such as extensive pipelining, super-scalar architectures, cache structures, out-of-order processing, burst access mechanisms, branch prediction, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor—legacy compatibility—furthermore accounts for much of the complexity that is present in a modern microprocessor. For market-driven reasons, many producers have opted to retain all of the capabilities that are required to insure compatibility with older, so-called legacy application programs as new designs are provided which incorporate new architectural features.

Nowhere has this legacy compatibility burden been more noticeable than in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of supporting compatibility with legacy applications and operating modes. Yet while in the past developers have been able to incorporate newly developed architectural features into existing instruction set architectures, the means whereby use of these features is enabled—programmable instructions—are becoming scarce. More specifically, there are no more "spare" instructions in certain instruction sets of interest that provide designers with a way to incorporate newer features into an existing architecture.

In the x86 instruction set architecture, for example, there are no remaining undefined 1-byte opcode states. All 256 opcode states in the primary 1-byte x86 opcode map are taken up with existing instructions. As a result, x86 microprocessor designers must presently make a choice to either provide new features or to retain legacy compatibility. If new programmable features are to be provided, then they must be assigned to opcode states in order for programmers to exercise those features. And if spare opcode states do not remain in an existing instruction set architecture, then some of the existing opcode states must be redefined to provide for specification of the new features. Thus, legacy compatibility is sacrificed in order to make way for new feature growth.

One area that continues to plague microprocessor designers concerns the amount of virtual memory that can be addressed by application programs. Early microprocessor designs provided for 8-bit addresses. Then, as application programs became more complex, the requirement to access larger areas of memory provided the momentum to increase the size of addresses to 16 bits, giving programmers the capability to access memory spaces up to 64 kilobytes (kB) in size. The incorporation of virtual memory techniques into the architecture of microprocessors has likewise extended the addressing boundaries experienced at the operating system level when several applications compete for memory resources. And while the amount of physical memory that can be accessed using virtual memory techniques is essentially unlimited, the amount of virtual memory that an application program can access is limited by address size, that is, the number of virtual address bits provided for by a particular microprocessor architecture.

The present state of the art in microprocessors for desktop/laptop computing applications provides for 32-bit virtual (or, linear) addresses, thus allowing programs to access up to 4 gigabytes (GB) of virtual memory space. The number of bits in a virtual address provided for in a particular microprocessor architecture is commonly referred to as an address mode. And to retain compatibility with legacy application programs, a present day desktop/laptop microprocessor provides programmers with the capability to operate in a 32-bit address mode, a 16-bit address mode, or even perhaps an 8-bit address mode.

But even at present, there are application programming areas that are disadvantageously impacted because present day microprocessors do not support extended address modes such as 64-bit data mode and 128-bit data mode. It is not uncommon to find image, signal, and multi-media applications that require access to arrays much greater than 4 GB in size. Yet, to support these extended addressing modes within an architecture that has no spare opcode values would require redefinition of existing opcodes, thereby abandoning support for legacy applications.

Therefore, what is needed is an apparatus and method that incorporate extended address modes into an existing microprocessor instruction set architecture having a completely full opcode set, where incorporation of the extended address modes additionally allows a conforming microprocessor to retain the capability to execute legacy application programs.

SUMMARY OF THE INVENTION

The present invention, among other applications, is directed to overcoming these and other problems and disadvantages of the prior art. The present invention provides a superior technique for extending a microprocessor instruction set beyond its current capabilities to provide for extended address modes that can be operated upon by prograniniable instructions in the microprocessor instruction set. In one embodiment an apparatus for extending address modes within a microprocessor is provided. The apparatus includes translation logic and extended execution logic. The translation logic translates an extended instruction into an associated micro instruction sequence for execution by the microprocessor, where the extended instruction has been fetched from external memory, and where the extended instruction has an extended prefix, an extended prefix tag, and instruction entities according to the existing instruction set. The extended prefix allows for pecification of one of a plurality of extended address modes for an address calculation corresponding to an operation, where each of the plurality of extended address modes corresponding to each of a plurality of address sizes, and where the each of said plurality of extended address modes is not otherwise provided for by instructions in an existing instruction set The extended prefix tag indicates the extended prefix, where the extended prefix tag includes a first opcode within the existing instruction set, wherein the first opcode otherwise specifies a first operation according to the existing instruction set. The extended prefix and the extended prefix tag, precede the instruction entities in the extended instruction. The instruction entities include a second opcode that prescribes the operation to be executed by the microprocessor. The extended execution logic is coupled to the translation logic. The extended execution logic receives the associated micro instruction sequence, and perfonns the address calculation to generate an extended address according to the one of the plurality of extended address modes.

One aspect of the present invention contemplates a mechanism for extending an existing microprocessor instruction set to provide for additional address modes. The mechanism includes an extended instruction and a translator. The extended instruction enables a proggammer to prescribe one of a plurality of extended address modes for calculation of an address corresponding to a prescribed operation, where the extended instruction has been fetched from external memory, and where the extended instruction includes a first opcode in the existing microprocessor instruction set followed by an n-bit extended prefix. The first opcode indicates the extended instruction and the n-bit extended prefix indicates the one of a plurality of extended address modes. Each of the plurality of extended address modes cannot otherwise be prescribed according to the existing microprocessor instruction set. The each of the plurality of extended address modes corresppnds to each of a plurality of address sizes, and the extended instruction further includes remaining instruction entities. The remaining instruction entities include a second opcode. The remaining instruction entities are configured to specify the prescribed operation and an address component for calculation of the address, where the address component is employed according to the one of a plurality of extended address modes for calculation of the address, and where the first opcode and the n-bit extended prefix precede the remaining instruction entities. The translator is configured to receive the extended instruction. The translator generates a micro instruction sequence directing a microprocessor to calculate the address as part of executing the prescribed operation, where the address is calculated according to the one of a plurarity of extended address modes.

Another aspect of the present invention comprehends an instruction set extension apparatus, for providing extended address mode capabilities to an existing instruction set. The instruction set extension apparatus has an escape tag, an extended address mode specifier, and extended execution logic. The escape tag is received by translation logic, and indicates that accompanying parts of a corresponding instruction prescribe an extended operation to be pefformed by a microprocessor, where the corresponding instruction has been fetched from external memory, and where the escape tag is a first opcode within the existing instruction set. The accompanying parts include a second opcode within the existing instruction set. The extended address mode specifier is coupled to the escape tag and is one of the accompanying parts. The extended address mode specifier prescribes one of a plurality of address modes that corresponds to the extended operation, where each of the plurality of extended address modes corresponds to each of a plurality of address sizes that cannot be prescribed according to the existing instruction set, and where the escape tag and the extended address mode specifier precede the accompanying parts of the corresponding instruction. The extended execution logic is coupled to the translation logic. The extended execution logic executes the extended operation using the one of the plurality of address modes.

A further aspect of the present invention provides a method for extending an existing instruction set architecture to provide for programmable specification of an extended address mode within a microprocessor. The extended address mode provides for a larger virtual memory space. The method includes fetching an extended instruction from external memory, the extended instruction including an extended tag along with an extended prefix, where the extended tag is a first opcode entity according to the existing instruction set architecture, and where first opcode entity otherwise prescribes a first operation according to the existing instruction set architecture; prescribing, via the extended prefix and remaining parts of the extended instruction, the one of plurality of extended address modes and a second operation, where each of the plurality of extended address modes corresponds to each of a plurality of address sizes, and where the existing instruction set architecture exclusively provides instructions for specifying address modes other than the each of the plurality of extended address modes, where the extended tag and extended prefix precede the remaining parts of the extended instruction, and where the remaining parts include a second opcode entity that prescribes the second operation; and executing the second operation according to the one of the plurality of extended address modes.

BRIEF DESCRIPTION OF THE DRAWINGS

These and other objects, features, and advantages of the present invention will become better understood with regard to the following description, and accompanying drawings where:

FIG. 1 is a block diagram illustrating a related art microprocessor instruction format;

FIG. 2 is a table depicting how instructions in a instruction set architecture are mapped to logic states of bits in an 8-bit opcode byte within the instruction format of FIG. 1;

FIG. 3 is a block diagram featuring an extended instruction format according to the present invention;

FIG. 4 is a table showing how extended architectural features are mapped to logic states of bits in an 8-bit extended prefix embodiment according to the present invention;

FIG. 9 is a flow chart depicting a method for translating and executing instructions that prescribe an extended address mode operation in a microprocessor according to the present invention.

DETAILED DESCRIPTION

Figure 5:
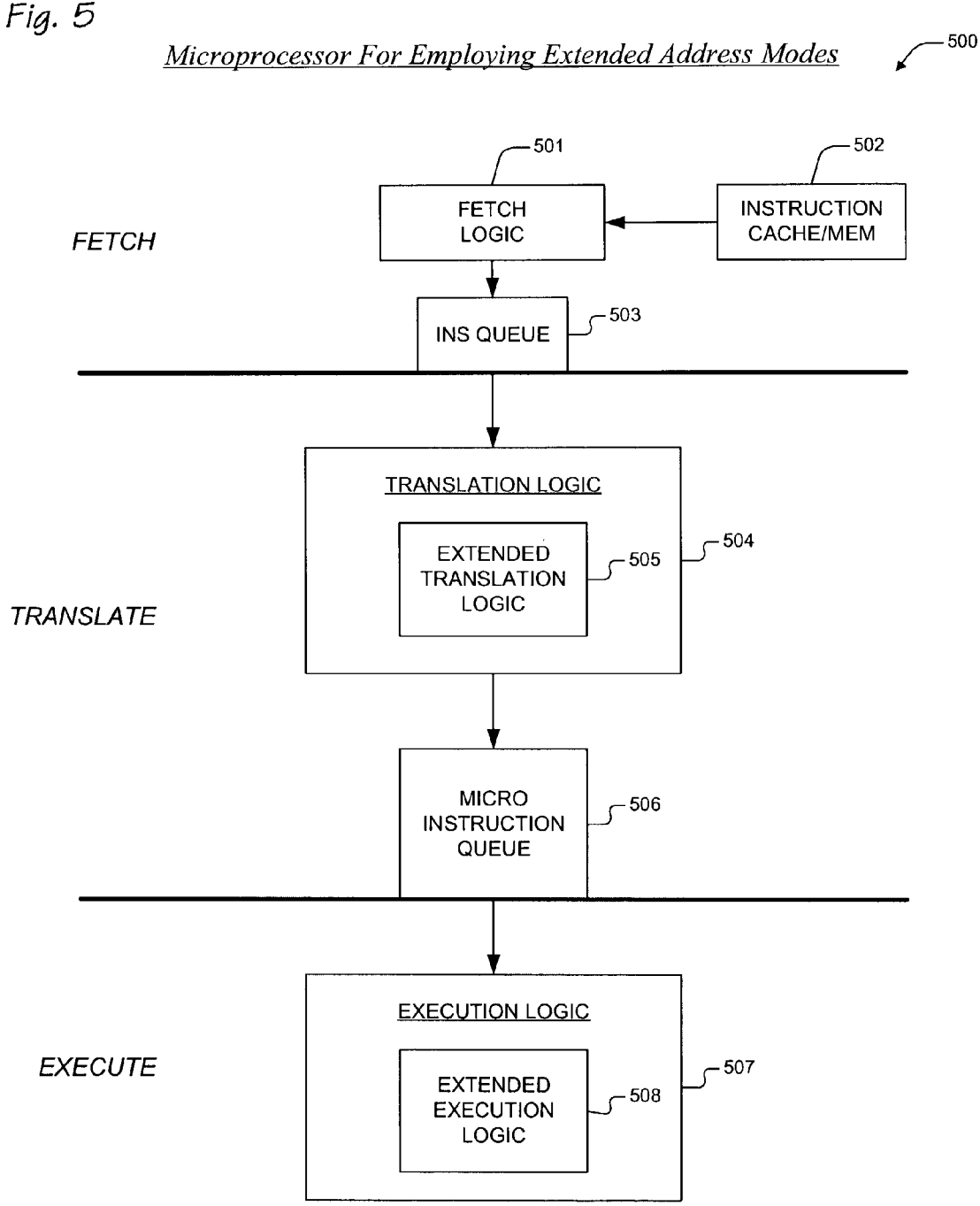
FIG. 5 is a block diagram illustrating a pipeline microprocessor for employing extended address modes according to the present invention.

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

In view of the above background discussion on the techniques employed within present day microprocessors to extend the architectural features of those microprocessors beyond the capabilities of their associated instruction sets, a related art example will now be discussed with reference to FIGS. 1-2. The discussion highlights the problems that microprocessor designers routinely face today. On the one hand, they desire to incorporate more recently developed architectural features into a microprocessor design and, on the other hand, market conditions dictate that they must retain the capability to execute legacy application programs. In the example of FIGS. 1-2, a completely defined opcode map rules out the possibility of defining new opcodes for the exemplary architecture. Thus, the designers are compelled to choose either to incorporate the new features and sacrifice legacy compatibility to some extent, or to forego more recent architectural advances altogether in favor of maintaining the ability to execute older application programs. Following the related art discussion, a discussion of the present invention will be provided with reference to FIGS. 3-9. By employing an existing, yet obsolete, opcode as a prefix tag for an extended instruction that follows, the present invention enables microprocessor designers to overcome the limitations of completely full instruction set architectures, thereby allowing them to provide programmers with the capability to perform operations using virtual addresses having a size greater than that which has heretofore been provided while concurrently retaining all the features that are required to run legacy application programs.

Turning to FIG. 1, a block diagram is presented illustrating a related art microprocessor instruction format 100. The related art instruction 100 has a variable number of instruction entities 101-103, each set to a specified value, that together make up a specific instruction 100 for a microprocessor. The specific instruction 100 directs the microprocessor to perform a specific operation such as adding two operands together, or moving an operand from/to memory to/from an internal register. In general, an opcode entity 102 within the instruction 100 prescribes the specific operation to be performed, and optional address specifier entities 103 follow the opcode 101 prescribing additional information about the specific operation such as how the operation is to be performed, where the operands are located, etc. The instruction format 100 additionally allows a programmer to prefix an opcode 102 with prefix entities 101. The prefixes 101 direct the application of specified architectural features during the execution of the specific operation prescribed by the opcode 102. Typically, these architectural features can be applied to most of the operations prescribed by any of the opcodes 102 in the instruction set. For example, prefixes 101 in many present day microprocessors direct operations to be executed using different virtual address sizes (e.g., 8-bit, 16-bit, 32-bit). Accordingly, these processors are programmed to a default address size (say, 32-bit), and prefixes 101 are provided in their respective instruction sets enabling programmers to selectively override the default operand size (say, to generate 16-bit virtual addresses) on an instruction-by-instruction basis. Selectable address size is merely one example of an architectural feature that spans a significant number of the operations (e.g., add, subtract, multiply, Boolean logic, etc.) prescribed by opcodes 102 within many present day microprocessors.

One well-known instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address/data sizes of an x86 microprocessor (i.e., opcode states 66H and 67H), another which directs the microprocessor to interpret a following opcode byte 102 according to alternative translation rules (i.e., prefix value 0FH, which causes translation to be performed according to the so-called 2-byte opcode rules), and other prefixes 101 which cause particular operations to be repeated until repetition criteria are satisfied (i.e., the REP opcodes: F0H, F2H, and F3H).

Referring now to FIG. 2, a table 200 is presented depicting how instructions 201 in an instruction set architecture are mapped to values of bits in an 8-bit opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding instruction opcode 201 (i.e., instruction I02 201). In the particular case of the x86 opcode map, it is well known in the art that opcode value 14H is mapped to the x86 Add With Carry (ADC) instruction opcode, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack and Interleave Low Packed Single-Precision Floating-Point Values (UNPCKLPS) operation instead of the Add With Carry (ADC). Features such as described in this x86 example are enabled in part in a present day microprocessor because instruction translation/decoding logic in the microprocessor interprets the entities 101-103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs which do not employ those specific opcode states. For example, a legacy program that never uses x86 opcode 0FH will still run on a present day x86 microprocessor. And a newer application program, by employing x86 opcode 0FH as a prefix 101, can utilize a substantial number of x86 architectural features that have been more recently incorporated such as single instruction multiple data (SIMD) operations and conditional move operations.

The incorporation of architectural feature advances has been accomplished in the past through the designation of available/spare opcode values 201 as prefixes 101 (also known as architectural feature tags/indicators 101 or escape instructions 101). Yet, many instruction set architectures 100 have run into a brick wall in terms of providing enhancements for a very straightforward reason: all of the available/spare opcode states have been used up, that is, all of the opcode values in the opcode map 200 have been architecturally specified. When all of the available opcode values have been assigned as either opcode entities 102 or prefix entities 101, then there are no more values left to provide for the incorporation of new features. This significant problem exists in many microprocessor architectures today and consequently forces designers to choose between adding architectural features to a design and retaining compatibility with older programs.

It is notable that the instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a fully populated 6-bit opcode map would exhibit 64 architecturally defined opcodes/prefixes 201 and would likewise provide no available/spare opcode values for expansion.

One alternative that stops short of entirely obliterating an existing instruction set and replacing it with a new format 100 and opcode map 200 is to substitute new instruction meanings for only a small subset of existing opcodes 201 that are presently used by application programs, say opcodes 40H through 4FH in FIG. 2. Under this hybrid technique, a conforming microprocessor operates exclusively in one of two operating modes: a legacy-compatible mode, where opcodes 40H-4FH are interpreted according to legacy rules, or an enhanced mode, where opcodes 40H-4FH are interpreted according to enhanced architectural rules. This technique indeed enables designers to incorporate new features into a design, but when the conforming microprocessor is running in an enhanced mode it excludes execution of any application program that uses opcodes 40H-4FH. Hence, from the standpoint of retaining legacy compatibility, the legacy-compatible/enhanced mode technique is not optimum.

The present inventors, however, have noted the frequency of use of certain opcodes 201 in instruction sets 200 having fully-populated opcode spaces over the breadth of application programs composed for execution on compliant microprocessors. They have accordingly observed that there are some opcodes 202 which, although they are architecturally defined, are not employed within application programs that are capable of being executed by the microprocessors. Instruction IF1 202 is depicted in FIG. 2 as such an example of this singularity. In fact, the very same opcode value 202 (i.e., F1H) maps to a valid instruction 202 in the x86 instruction set architecture that is not presently employed by any extant application program. While the unused x86 instruction 202 is a valid x86 instruction 202 that directs an architecturally specified operation on an x86 microprocessor, it is not employed in any application program that can be executed on any present day x86 microprocessor. The particular x86 instruction 202 is known as In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 no longer exists. Hence, in the x86 case, the present inventors have identified a means within a completely occupied instruction set architecture 200 whereby they can exploit a valid, yet obsolete, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for in an n-bit prefix that follows, thus allowing microprocessor designers to incorporate up to $2^n$ more recently developed architectural features into an existing microprocessor design, while concurrently retaining complete compatibility with all legacy software.

The present invention exploits the prefix tag/extended prefix concept by providing an n-bit extended address size specifier prefix whereby programmers are enabled to prescribe an extended address mode for a corresponding operation on an instruction-by-instruction basis in a microprocessor. The extended address mode is provided over and above those existing address modes supporting by the microprocessor's existing instruction set architecture. The present invention will now be discussed with reference to FIGS. 3-9.

Turning to FIG. 3, a block diagram is presented featuring an extended instruction format 300 according to the present invention. Very much like the format 100 discussed with reference to FIG. 1, the extended instruction format 300 has a variable number of instruction entities 301-305, each set to a specified value, that together make up a specific instruction 300 for a microprocessor. The specific instruction 300 directs the microprocessor to perform a specific operation such as adding two operands together, or moving an operand from memory to a register within the microprocessor. Typically, an opcode entity 302 in the instruction 300 prescribes the specific operation to be performed, and optional address specifier entities 303 follow the opcode 302 prescribing additional information about the specific operation such as how the operation is to be performed, registers where the operands are located, displacement data to be used in computation of a virtual address for the operation, etc. The instruction format 300 also allows a programmer to prefix an opcode 302 with prefix entities 301 that direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301-303 in a formatted extended instruction 300. The purpose of the two additional entities 304, 305 is to provide the capabilities for programmers to specify an extended address mode within a conforming microprocessor for the purpose of calculating an extended address according to the extended address mode, where the extended address mode is not otherwise programmable by an existing instruction set for the conforming microprocessor. The two additional entities 304, 305 provide for the incorporation of larger virtual memory spaces in a microprocessor design having a fully populated instruction set architecture. The optional entities 304, 305 are an extended instruction tag 304 and an extended address size specifier prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the extended prefix 305, or extended features specifier 305, follows, where the extended prefix 305 prescribes a virtual address size, or address mode, that corresponds to a specified operation. In one embodiment, the escape tag 304 indicates that accompanying parts 301-303, 305 of a corresponding instruction 300 prescribe an extended operation to be performed by the microprocessor. The extended address size specifier 305, or extended prefix 305, prescribes one of a plurality of address modes that correspond to generation of an address or addresses associated with execution of a prescribed operation. Extended address logic in the microprocessor generates an extended address according to the specified address mode to enable access of operands in virtual memory space during execution of the extended operation.

To summarize the extended address mode technique according to the present invention, an extended instruction is configured to prescribe an extended address mode in an existing microprocessor instruction set, where the extended address mode cannot otherwise be prescribed according to the existing microprocessor instruction set. The extended instruction includes one of the opcodes/instructions 304 in the existing instruction set and an n-bit extended prefix 305. The selected opcode/instruction serves as an indicator 304 that the instruction 300 is an extended features instruction 300 (that is, it prescribes extensions to the microprocessor architecture), and the n-bit features prefix 305 indicates the extended address mode. In one embodiment, the extended prefix 305 is 8-bits in size, providing for the specification of up to 256 different address modes or a combination of extended address modes and other extended features. An n-bit prefix embodiment provides for the specification of up to $2^n$ different address modes. In one embodiment, a 64-bit address mode is provided for that overrides a default address mode (say, 32-bit or 16-bit) that is in place for a conforming microprocessor. Accordingly, during execution of the corresponding operation, a 64-bit virtual address is generated by extended address logic, where operands required for calculation of the virtual address are provided via a 64-bit register file or as a direct 64-bit displacement by providing additional address specifiers as part of the extended instruction. A further embodiment allows a programmer to specify either 64-bit, 128-bit, 256-bit, 512-bit, or 1024-bit address mode for an associated address calculation.

Now turning to FIG. 4, a table 400 is presented showing how extended address modes are mapped to logic states of bits in an 8-bit extended prefix embodiment according to the present invention. Similar to the opcode map 200 discussed with reference to FIG. 2, the table 400 of FIG. 4 presents an exemplary 8-bit extended address mode prefix map 400 that associates up to 256 values of an 8-bit extended prefix entity 305 with corresponding extended address modes 401 (e.g., E34, E4D , etc.) of a conforming microprocessor. In the case of an x86 embodiment, the 8-bit extended feature prefix 305 according to the present invention serves to provide for address modes 401 (i.e., E00-EFF) which are not provided for by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, including those noted above, can be incorporated into an existing instruction set according to the escape tag 304/extended prefix 305 technique described herein. The 8-bit prefix embodiment of FIG. 4 provides for up to 256 different features 401, however, an n-bit prefix embodiment can allow for programming of up to $2^n$ different features 401.

Now referring to FIG. 5, a block diagram is presented illustrating a pipeline microprocessor 500 for performing extended address mode operations according to the present invention. The microprocessor 500 has three notable stage categories: fetch, translate, and execute. The fetch stage has fetch logic 501 that retrieves instructions from an instruction cache 502 or external memory 502. The retrieved instructions are provided to the translate stage via an instruction queue 503. The translate stage has translation logic 504 that is coupled to a micro instruction queue 506. The translation logic 504 includes extended translation logic 505. The execute stage has execution logic 507 having extended execution logic 508 therein.

In operation, the fetch logic 501 retrieves formatted instructions according to the present invention from the instruction cache/external memory 502, and places these instructions in the instruction queue 503 in execution order. The instructions are retrieved from the instruction queue 503 and are provided to the translation logic 504. The translation logic 504 translates/decodes each of the provided instructions into a corresponding sequence of micro instructions that, directs the microprocessor 500 to perform the operations prescribed by the instructions. The extended translation logic 505 detects those instructions having an extended prefix tag according to the present invention and also provides for translation/decoding of corresponding extended address mode specifier prefixes along with decoding of address specifier entities in accordance with specified extended address mode. In an x86 embodiment, the extended translation logic 505 is configured to detect an extended prefix tag of value F1H, which is the x86 ICE BKPT opcode. Extended micro instruction fields along with are provided in the micro instruction queue 506 to allow for the prescription of extended address modes along with operands and displacements required for address calculations by extended execution logic 508.

The micro instructions are provided from the micro instruction queue 506 to the execution logic 507, wherein the extended execution logic 508 is configured to access internal microprocessor registers therein according to address mode specification by the extended micro instruction fields. A plurality of address operands (if required) are retrieved from registers as prescribed for employment during execution of a specified operation. The extended execution logic 508 employs the register/displacement operands to generate extended addresses sized according to the specified extended address mode and any performs the memory access and/or operation prescribed by the micro instructions.

One skilled in the art will appreciate that the microprocessor 500 described with reference to FIG. 5 is a simplified representation of a present day pipeline microprocessor 500. In fact, a present day pipeline microprocessor 500 comprises upwards to 20-30 pipeline stages. However, these stages can be generally categorized into those three stage groups shown in the block diagram and thus, the block diagram 500 of FIG. 5 serves to teach the essential elements that are required to implement embodiments of the present invention as described hereinabove. Those elements of a microprocessor 500 which are extraneous to the present discussion, for clarity, are not depicted.

Figure 6:
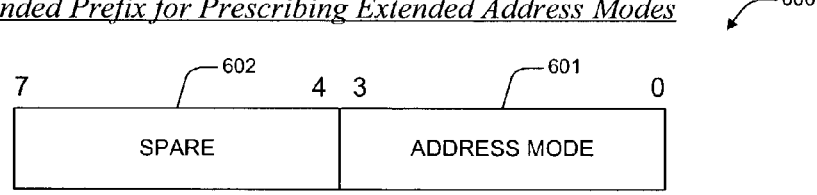
FIG. 6 is a block diagram featuring one embodiment of an extended prefix for prescribing an extended address mode in a microprocessor according to the present invention.

Turning now to FIG. 6, a block diagram is presented featuring one embodiment of an extended prefix 600 for prescribing extended address modes in a microprocessor according to the present invention. The extended address mode specifier prefix 600 is 8-bits in size. The extended prefix 600 includes an address mode field 601 and a spare field 602. In one embodiment, the value of the address mode field 601 specifies an extended address mode for generation of an extended address corresponding to a prescribed operation, where the prescribed operation along with operands for use in generation of the extended address are specified by remaining parts of an extended instruction according to the present invention, as herein described. In an x86 embodiment, the extended address mode (e.g, 64-bit virtual addresses) is prescribed to override a default address mode (e.g., 32-bit virtual addresses).

The exemplary embodiment of an extended prefix 600 according to the present invention as shown in FIG. 6 reflects an application where a 4-bit address mode field 601 is employed to specify an extended address mode. One skilled in the art will appreciate, however, that the number of bits required to specify one from among a plurality of extended address modes depends upon the number of extended address modes within the plurality. Accordingly, an embodiment capable of prescribing either a 64-bit, 128-bit, 256-bit, 512-bit, or 1024-bit address mode would require a 3-bit address mode field 601 to distinguish between the five modes. Consequently, the remaining bits of the prefix 600 can be employed as a spare field 602 or to specify other extended features beyond those provided for by the existing instruction set architecture.

Figure 7:
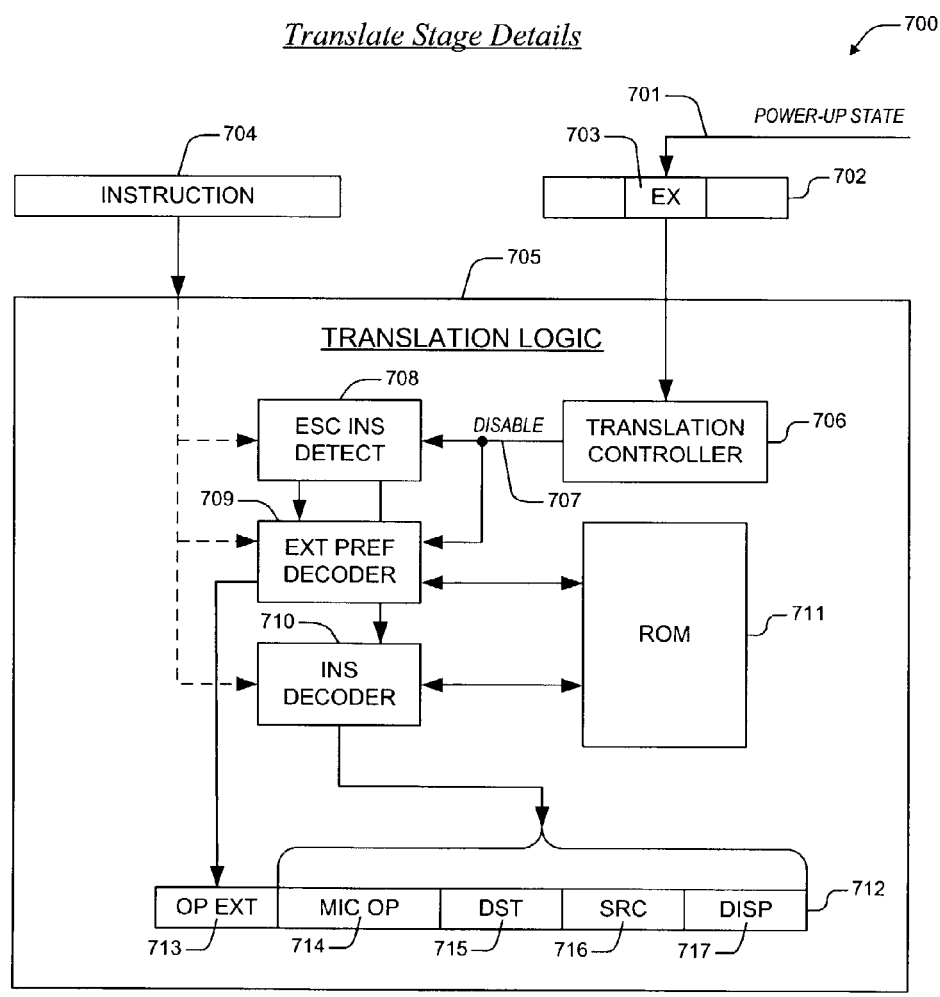
FIG. 7 is a block diagram featuring details of translate stage logic within the microprocessor of FIG. 5.

Turning now to FIG. 7, a block diagram is presented featuring details of translate stage logic 700 within the microprocessor of FIG. 5. The translate stage logic 700 has an instruction buffer 704 that provides an extended instruction to translation logic 705. The translation logic 705 is coupled to a machine specific register 702 that has an extended features field 703. The translation logic 705 has a translation controller 706 that provides a disable signal 707 to an escape instruction detector 708 and an extended decoder 709. The escape instruction detector 708 is coupled to the extended decoder 709 and an instruction decoder 710. The extended decoding logic 709 and the instruction decoding logic 710 access a control read-only memory (ROM) 711, wherein are stored template micro instruction sequences that correspond to some of the extended instructions. The translation logic 705 also has a micro instruction buffer 712 having an opcode extension field 713, a micro opcode field 714, a destination field 715, a source field 716, and a displacement field 717. The displacement field 717 is sized to accommodate displacement values commensurate with the extended address mode having the greatest number of address bits.

Operationally, during power-up of the microprocessor, the state of the extended field 703 within the machine specific register 702 is established via signal power-up state 701 to indicate whether the particular microprocessor is capable of translating and executing extended instructions according to the present invention for providing extended address modes in the microprocessor. In one embodiment, the signal 701 is derived from a feature control register (not shown) that reads a fuse array (not shown) configured during fabrication of the part. The machine specific register 702 provides the state of the extended features field 703 to the translation controller 706. The translation control logic 706 controls whether or not instructions from the instruction buffer 704 are translated according to extended translation rules or according to conventional translation rules. Such a control feature is provided to allow supervisory applications (e.g., BIOS) to enable/disable extended execution features of the microprocessor. If extended features are disabled, then instructions having the opcode state selected as the extended features tag would be translated according to the conventional translation rules. In an x86 embodiment having opcode state F1H selected as the tag, an occurrence of F1H under conventional translation would result in an illegal instruction exception. With extended translation disabled, the instruction decoder 710 would translate/decode all provided instructions 704 and would configure all fields 713-717 of the micro instruction 712. Under extended translation rules, however, occurrence of the tag would be detected by the escape instruction detector 708. The escape instruction detector 708 would accordingly direct the instruction decoder 710 to translate/ decode the remaining parts of the extended instruction according to extended translation rules and to configure the micro opcode field 714, source field 716, destination field 715, and displacement field 717 of the micro instruction 712. The extended decoder 709 would decode/translate the extended prefix to configure the micro opcode extension field 713. Certain instructions would cause access to the control ROM 711 to obtain corresponding micro instruction sequence templates. Configured micro instructions 712 are provided to a micro instruction queue (not shown) for subsequent execution by the processor.

Figure 8:
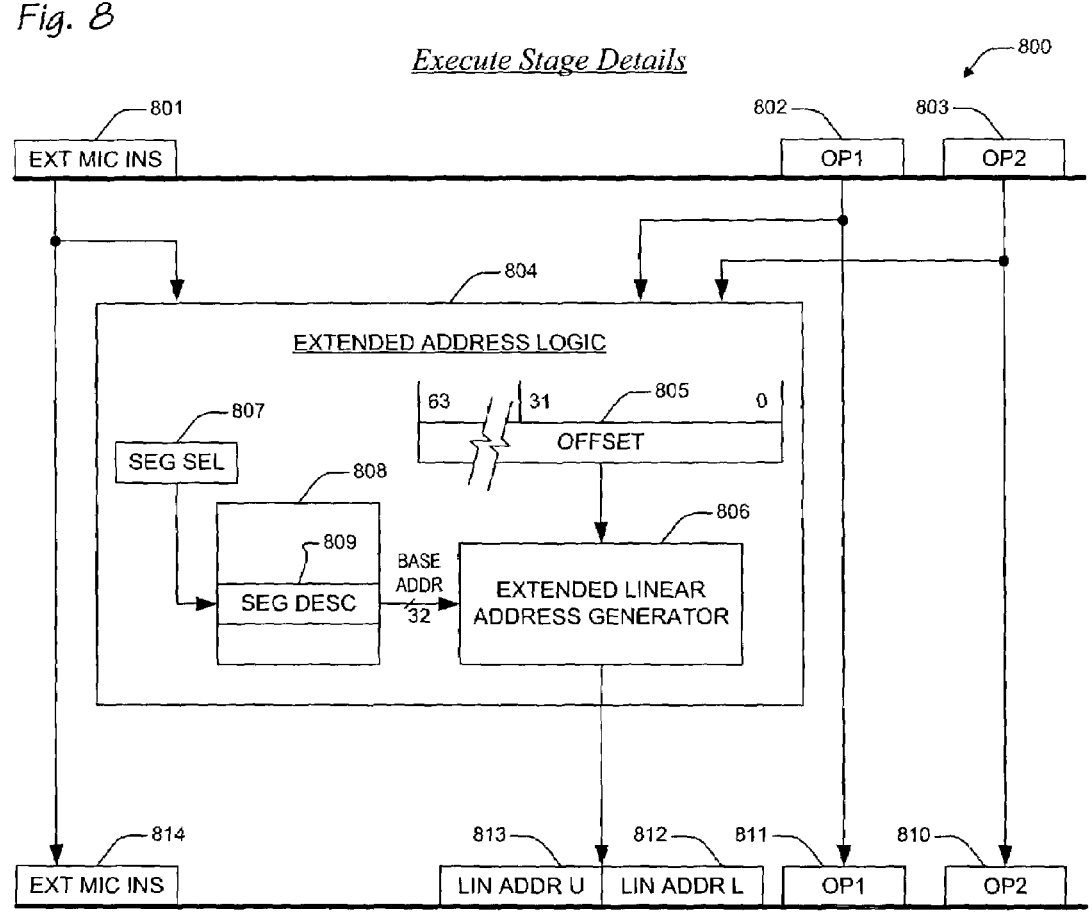
FIG. 8 is a block diagram illustrating extended execute stage logic within the microprocessor of FIG. 5.

Now referring to FIG. 8, a block diagram is presented illustrating extended execute stage logic 800 within the microprocessor of FIG. 5. The extended execute stage logic 800 has extended address logic 804 that retrieves an extended micro instruction according to the present invention from a micro instruction buffer 801. The extended address logic 804 has an extended linear address generator 806, that is coupled to a segment descriptor table 808. A segment selector 807 within the extended address logic 804 is coupled to the segment descriptor table to index a particular segment descriptor 809 within the descriptor table 808. A segment base address BASE ADDR corresponding to a current linear (i.e., virtual) address calculation is output from the indexed segment descriptor 809 and is provided to the linear address generator 806. An offset buffer 805 is also input to the linear address generator 806. The linear address generator 806 provides a linear address output to upper and lower linear address buffers 813, 812.

An operational discussion of the execute stage details according to the present invention is presented in the context of a segmented x86 embodiment, however, one skilled in the art will appreciate that the present invention comprehends execute stage details and virtual address generation techniques other than those associated with the x86 architecture. Other architectures employ slightly different techniques to compute a virtual address, yet the principles discussed herein can easily be applied to those techniques as well.

Following translation, as micro instructions are piped in synchronization with a microprocessor clock signal (not shown) through sequential execution pipeline stages, operands associated with the micro instructions are retrieved from a register file (not shown) and are provided to operand input buffers 802, 803 along with an associated extended micro instruction in buffer 801. The extended micro instruction and operands are provided to the extended address logic 804 for use (if required) in the computation of an extended linear address. According to opcode specification within the extended micro instruction, the extended address logic 804 is directed to generate an offset (or effective address) using a combination of the operands from buffers 802-803 and the displacement field (not show) provided via the extended micro instruction. The offset is provided in an offset buffer 805. In a segmented virtual memory system such as is shown in x86 embodiment 800, the offset 805 is the memory address that an application program effectively computes for the purposes of accessing memory. Accordingly, the offset buffer 805 is sized to support computation of effective addresses according to the size of extended address modes provided. In a 64-bit extended address embodiment, a 64-bit offset buffer 805 is provided as shown in the example. For a 1024-bit extended address embodiment, a 1024-bit offset buffer 805 is required.

The segment base address BASE ADDR is generally summed with the calculated effective address using Boolean arithmetic according to the specified address mode to yield a linear address, which is provided to linear address registers 812-813. Thus, the segment selector buffer 807 is programmed to allow areas of virtual memory to be segmented according to requirements of an associated operating system. In the embodiment shown in FIG. 8, the construction and operation of the segment selector buffer 807 and segment descriptor table 808 are commensurate with existing x86 architecture conventions: a 32-bit segment base address BASE ADDR is provided to the address generator 806. However, in accordance with a 64-bit extended address embodiment, the 32-bit BASE ADDR is summed together with a 64-bit offset to yield a 64-bit linear address, the lower 32 bits of which are provided to linear address buffer 812 and the upper 32 bits of which are provided to linear address buffer 813. Micro instructions that do not extend the existing architecture's address modes yield linear addresses which are provided only to lower linear address buffer 812. In synchronization with the pipeline clock, the linear address, extended micro instruction, and the operands are clocked to buffers 813-812, 814, 811, and 810 for retrieval by a subsequent stage of execution logic.

Now referring to FIG. 9, a flow chart 900 is presented depicting a method for translating and executing instructions that enables a programmer to specify an extended address mode in a microprocessor according to the present invention. Flow begins at block 902 wherein a program configured with extended feature instructions is provided to a microprocessor. Flow then proceeds to block 904.

At block 904, a next instruction is fetched from cache/memory. Flow then proceeds to decision block 906.

At decision block 906, the instruction fetched in block 904 is evaluated to determine if an extended escape code is provided according to the present invention. In an x86 embodiment, the evaluation is made to detect opcode value F1 (ICE BKPT). If the extended escape code is detected, then flow proceeds to block 908. If the extended escape code is not present, then flow proceeds to block 912.

At block 908, an extended prefix part of the extended instruction is decoded/translated to determine an extended address mode that has been prescribed for generation of an extended address for an associated operation. Flow then proceeds to block 910.

At block 910, the extended address mode for the present operation is prescribed in an extension field of a corresponding micro instruction sequence. Flow then proceeds to block 912.

At block 912, all remaining parts of the instruction are decoded/translated to determine the prescribed operation, register locations of operands and displacement for computation of an address (i.e. a conventional address or an extended address) and for use as operands in the operation, along with the application of existing architectural features prescribed by prefixes according to the existing instruction set architecture. Flow then proceeds to block 914.

At block 914, a micro instruction sequence is configured to specify the prescribed operation along with its corresponding opcode extensions. Flow then proceeds to block 916.

At block 916, the micro instruction sequence is provided to a micro instruction queue for execution by the microprocessor. Flow then proceeds to block 918.

At block 918, the micro instruction sequence is retrieved by extended address logic according to the present invention. The extended address logic generates the address according to the specified address mode using provided register operands and/or displacement. The address is sized according to the specified address mode (i.e., conventional or extended) prescribed within the micro instruction sequence. Flow then proceeds to block 920.

At block 920, extended execution logic executes the prescribed operation to generate results. Flow then proceeds to block 922.

At block 922, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that allows a programmer to specify extended data modes in an extended instruction which are not otherwise provided for by existing instructions in a microprocessor instruction set.

In addition, the present invention has been predominately described in terms of 64-bit extended address mode. This mode is, however, provided only to teach aspects of the present invention in the context of present day address modes exhibited by desktop/laptop microprocessors. One skilled in the art will appreciate, however, that the scope of the present invention can be extended to applications requiring very large or very small addresses, odd-sized addresses, or applications having variable addresses where the size of a particular address is specified on an instruction-by-instruction basis.

Furthermore, although the present invention has been discussed herein primarily in terms of a segmented virtual addressing architecture such as is prevalent within most desktop/laptop schemes today, one skilled in the art will appreciate that the principles and techniques taught herein can be applied equally well to flat memory addressing schemes and architectures that directly generate physical addresses within application programs.

Moreover, although a microprocessor setting has been employed to teach the present invention and its objects, features, and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus, for extending address modes within a microprocessor, the apparatus comprising:
   hardware translation logic, configured to translate an extended instruction into an associated micro instruction sequence for execution by the microprocessor, wherein said extended instruction has been fetched from external memory, and wherein said extended instruction comprises:
      an extended prefix, configured to allow for specification of one of a plurality of extended address modes for address calculation corresponding to an operation, wherein said each of said plurality of extended address modes correspond to one of a plurality of address sizes, and wherein said each of said plurality of extended address modes is not otherwise provided for by instructions in an existing instruction set;
      an extended prefix tag, configured to indicating said extended prefix, wherein said extended prefix tag comprises a first opcode within said existing instruction set, and wherein in said first opcode otherwise specifies a first operation according to said exhisting instruction set; and
      instruction entities according to said existing instructionset, wherein said extended prefix and said extented prefix tag precede said instruction entities in said extended instruction, and wherein said instruction entities comprise a second opcode that prescribes said operation to be executed by the microprocesser; and
   extended execution logic, coupled to said translation logic, for receiving said associated micro instruction sequence, and for performing said address calculation to generate an extended address according to said one of a plurality of extended address modes.

2. The apparatus as recited in claim 1, wherein said plurality of extended address modes comprises a 64-bit address mode, said 64-bit address mode being employed for generation of said extended address, and wherein said extended address comprises 64 bits.

3. The apparatus as recited in claim 2, wherein said plurality of extended address modes further comprises a 128-bit address mode and a 256-bit address mode.

4. The apparatus as recited in claim 1, wherein said extended prefix is configured to direct the microprocessor to override a default address mode for said address calculation during execution of said operation.

5. The apparatus as recited in claim 1, wherein said extended prefix comprises 8 bits.

6. The apparatus as recited in claim 1, wherein said extended prefix comprises:
   an extended address mode field, configured to enable specification of said one of a plurality of extended address mode for calculation of said extended address.

7. The apparatus as recited in claim 1, wherein said existing instruction set comprises the x86 instruction set.

8. The apparatus as recited in claim 7, wherein said extended prefix tag comprises opcode F1 (ICE BKPT) in the x86 instruction set.

9. The apparatus as recited in claim 1, wherein said translation logic comprises:
   escape instruction detection logic, configured to detect said extended prefix tag;
   instruction decoding logic, configured to determine said operation to be performed; and
   extended decoding logic, coupled to said escape instruction detection logic and said instruction decoding logic, configured to determine said one of a plurality of extended address modes, and configured to prescribe said one of a plurality of extended address modes within said associated micro instruction sequence.

10. A mechanism, for extending an existing microprocessor instruction set to provide for additional address modes, the mechanism comprising:
an extended instruction, configured to enable a programmer to prescribe one of a plurality of extented adress modes for calculation of an address corresponding to a prescribed operation, wherein said extended instruction has been fetched from external memory, and wherein said extended instruction comprises a first opcode in the existing microprocessor instruction set followed by an n-bit extended prefix wherein said first opcode otherwise specifies a first operation according to said existing instruction set, said first opcode indicating said extended instruction and said n-bit extended prefix indicating said one of a plurality of extended address modes, wherein each of said plurality of extended address modes cannot otherwise be prescribeb according to the existing microprocessor instruction set, and wherein said each of said plurality of extended address modes corresponds to one of a plurality of address sizes, and wherein said extended instruction further comprises remaining instruction entities, said remaining instruction entities comprising a second opcode, wherein said remaining instruction entities are configured to specify said prescribed operation and an address component for calculation of said address, and wherein said address component is employed according to said one of a plurality of extended address modes for calculation of said addres, and wherein said first opcode and said n-bit extended prefix precede said remaining instruction entities; and
a hardware translator, configured to receive said extended instruction, and configured to generate a micro instruction sequence directing a microprocessor to calculate said address as part of executing said prescribed operation, wherein said address is calculated according to said one of a plurality of extended address modes.

11. The mechanism as recited in claim 10, wherein said n-bit prefix comprises:
an address mode override field, configured to specify said one of a plurality of extended address modes for generation of said address.

12. The mechanism as recited in claim 11, wherein said address mode override is configured to specify a 64-bit address mode, a 128-bit address mode, or a 256-bit address mode.

13. The mechanism as recited in claim 10, wherein said n-bit extended prefix comprises 8 bits.

14. The mechanism as recited in claim 10, wherein the existing microprocessor instruction set is the x86 microprocessor instruction set.

15. The mechanism as recited in claim 10, wherein said first opcode comprises opcode ICE BKPT (i.e., opcode F1) in the x86 microprocessor instruction set.

16. The mechanism as recited in claim 10, wherein said translator comprises:
an escape instruction detector, cofigured to detect said first opcode within said extended instruction;
an instruction decoder, configured to decode said remaining instruction entities of said extended instruction to determine said predescribed operation; and
an extended prefix decoder, coupled to said escape instruction detector and said instruction decoder, configured to decode said n-bit extended prefix, configured to specify said one of a plurality of extended address modes within said micro instruction sequence.

17. An instruction set extension apparatus, configured to provide extended address mode capabilities to an existing instruction set, the instruction set extension apparatus comprising:
an escape tag, for reception by hardware translation logic, and configured to indicate that accompanying parts of a corresponding instruction prescribe an extended operation to be performed by a microprocessor, wherein said corresponding instruction has been fetched from external memory, and wherein said escape tag is a first opcode within the existing instruction set and wherein said accompanying parts comprise a second opcode within the existing instruction set;
an extended address mode specifier, coupled to said escape tag and being one of said accompanying parts, configured to prescribe one of a plurality of address modes that corresponds to said extended operation wherein each of said plurality of extended address modes corresponds to one of a plurality of address sizes that cannot be prescribed according to the exhisting instruction set, and wherein said escape tag and said extended address mode specifier precede said accompanying parts of said corresponding instruction; and
extended execution logic, coupled to said translation logic, configured to execute said extended operation using said one of said plurality of address modes.

18. The instruction set extension apparatus as recited in claim 17, wherein remaining ones of said accompanying parts further comprise an optional plurality of address specifiers, configured to specify a plurality of address operands, wherein said plurality of address operands is employed to generate an extended address according to said one of a plurality of address modes.

19. The instruction set extension apparatus as recited in claim 17, wherein said extended address mode specifier comprises 8 bits.

20. The instruction set extension apparatus as recited in claim 17, wherein the existing instruction set is the x86 instruction set.

21. The instruction set extension apparatus as recited in claim 17, wherein said first opcode comprises the ICE BKPT opcode (i.e., opcode F1) in the x86 instruction set.

22. The instruction set extension apparatus as recited in claim 17, wherein said translation logic is configured to translate said escape tag and said accompanying parts into corresponding micro instructions that direct said extended execution logic to generate an address according to said one of said plurality of address modes during execution of said extended operation.

23. The instruction set extension apparatus as recited in claim 17, wherein said one of said plurality of address modes comprises a 64-bit data mode.

24. The instruction set extension apparatus as recited in claim 17, wherein said one of said plurality of address modes comprises a 128-bit data mode.

25. The instruction set extension apparatus as recited in claim 17, wherein said translation logic comprises:
escape tag detection logic, configured to detect said escape tag, and configured to detect that said accompanying parts be translated according to extended translation conventions; and
decoding logic, coupled to said escape tag detection logic, configured to perform translation of instructions according to conventions of the existing instruction set, and configured to perform translation of said corresponding instruction according to said extended translation conventions to enable execution of said extended operation according to said one of said plurality of address modes.

26. A method for extending an existing instruction set architecture to provide for programmable specification of an extended address mode within a microprocessor, the extended address mode providing for a larger virtual memory space, the method comprising:

fetching an extended instruction from external memory, the extended instruction including an extended tag along with an extended prefix, wherein the extended tag is a first opcode entity according to the existing instruction set architecture, and wherein the first opcode entity otherwise prescribes a first operation according to the existing instruction set architecture;

prescribing, via the extended prefix and remaining parts of the extended instruction one of a plurality of extended address modes and a second operation, wherein each of the plurality of extended address modes corresaonds to one of a plurality of address sizes, and wherein the existing instruction set architecture exclusively provides instructions for specifying address modes other than the each of the plurality of extended address modes, wherein the extended tag and extended prefix precede the remaining parts of the extended instruction, and wherein the remaining parts include a second opcode entity that prescribes the second operation; and executing the second operation according to the one of the plurality of extended address modes.

27. The method as recited in claim 26, wherein said prescribing comprises:

first specifying the second operation, wherein said first specifying comprises employing the second opcode entity according to the existing instruction set architecture.

28. The method as recited in claim 26, wherein said fetching comprises employing an 8-bit entity to configure the extended prefix.

29. The method as recited in claim 26, wherein said fetching comprises selecting the first opcode entity according to the x86 microprocessor instruction set architecture.

30. The method as recited in claim 26, wherein said selecting comprises choosing the x86 ICE BKPT opcode (i.e., opcode F1) as the extended tag.

31. The method as recited in claim 26, further comprising:

translating the extended instruction into a micro instruction sequence that directs extended execution logic to generate an extended address according to the one of plurality of extended address modes, and to employ the extended address to perform the second operation.

32. The method as recited in claim 31, wherein said translating comprises:

within translation logic, detecting the extended tag; and decoding the extended prefix and the remaining parts according to extended translation rules to override a default address mode for the second operation.

33. The method as recited in claim 26, wherein said prescribing comprises:

specifying a 64-bit address mode as the one of the plurality of extended address modes.

34. The method as recited in claim 26, wherein said prescribing comprises:

specifying one of the following address modes as the one of the plurality of extended address modes: 64-bit, 128-bit, 256-bit, 512-bit, 1024-bit.

* * * * *